United States Patent [19]

Penkman et al.

[11] 4,017,236
[45] Apr. 12, 1977

[54] MOLD-CLAMPING MECHANISM FOR INJECTION-MOLDING MACHINE

[75] Inventors: Dave Penkman, Oakville; Herbert Rees, Willowdale, both of Canada

[73] Assignee: Husky Injection Molding Systems Inc., Bolton, Canada

[22] Filed: Nov. 26, 1975

[21] Appl. No.: 635,638

[52] U.S. Cl. .............................. 425/150; 425/450.1; 425/451.2; 425/451.9; 425/DIG. 221; 92/62; 92/151
[51] Int. Cl.² .......................... B29C 1/16; B29F 1/00
[58] Field of Search ......... 425/450.1, 451.2, 451.7, 425/451.9, 150, DIG. 221, DIG. 223, 242 R; 92/62, 151

[56] References Cited

UNITED STATES PATENTS

| | | | |
|---|---|---|---|
| 2,983,256 | 5/1961 | Seeloff | 92/151 |
| 3,015,849 | 1/1962 | Mittelstadt et al. | 425/DIG. 223 X |
| 3,590,437 | 7/1971 | Annis et al. | 425/DIG. 221 X |
| 3,656,877 | 4/1972 | Aoki | 425/242 R X |
| 3,768,953 | 10/1973 | Dangremond et al. | 425/451.2 |
| 3,847,528 | 11/1974 | Farrell | 425/450.1 |

Primary Examiner—Robert L. Spicer, Jr.
Attorney, Agent, or Firm—Karl F. Ross; Herbert Dubno

[57] ABSTRACT

A clamping mechanism, effective to press a movable platen against a fixed platen in a terminal phase of a mold-closing stroke of an injection-molding machine, comprises a series of coaxial annular pistons received with progressively larger clearances in respective inner peripheral grooves of a stationary housing linked by tie rods with the fixed platen. The pistons, which can be interconnected by elastic bolts, bear upon a mounting frame, slidable along the tie rods, supporting a pair of laterally withdrawable shutters which in their retracted position give passage to a tubular thrust member coaxially surrounding a plunger secured to that thrust member and to the movable platen. The opposite end of the plunger carries a piston head received, within the housing, in a central driving cylinder to which hydraulic fluid can be admitted from either end for advancing or retracting the movable platen in a mold-closing or a mold-opening stroke. In a forward position of the movable platen, the tubular thrust member just clears the shutters which are then moved toward each other into a working position behind that member whereupon fluid is admitted to the housing grooves for pressurizing the cascaded annular pistons to clamp the mold shut. Normally, the cascaded pistons move as a unit into and out of their clamping position; if, however, the absence of a mold or an incorrect positioning of the shutters results in overtravel, these pistons separate against the elastic force of their connecting bolts, if any, as they come at staggered intervals to rest against the end walls of their respective grooves, thereby dividing the reaction force between the housing and the several pistons.

11 Claims, 7 Drawing Figures

FIG. 1

MOLD-CLAMPING MECHANISM FOR INJECTION-MOLDING MACHINE

FIELD OF THE INVENTION

Our present invention relates to a mold-clamping mechanism for an injection-molding machine, designed to apply supplemental pressure to a mold held closed between two relatively movable platens.

BACKGROUND OF THE INVENTION

Mold-clamping mechanisms operating independently of a reciprocacting mold drive, designed to resist the pressure of the injected thermoplastic or other molding material, are well known in the art. These mechanisms are usually operated by a high-pressure fluid, generally a hydraulic liquid, and may comprise a plurality of cascaded pistons whose cylinders are pressurized simultaneously to increase the clamping force, e.g. as described in U.S. Pat. No. 3,847,528.

In order to facilitate the transmission of the piston force to the movable platen, a thrust member rigid with that platen may be clamped between two relatively movable jaws engaed by one of the clamping pistons. It is also possible, e.g. as described in U.S. Pat. No. 3,829,266, to align such a thrust member with an aperture in a support, the thrust member passing through that aperture when the mold is open, and to slide a piston-cylinder unit on the support across the aperture after the thrust member has been withdrawn therefrom in the mold-closed position, the hydraulic expansion of that unit then exerting the desired clamping pressure.

A problem encountered with such fluid-operated clamping mechanisms is the risk that, on account of human error or a malfunction, the mold is not properly inserted between the platens or the force-transmitting devices are not in working position so that the clamping force finds no purchase on the platen and must be absorbed by the cylinder housing. This problem of overtravel is dealt with in prior systems, such as that of the aforementioned U.S. Pat. No. 3,847,528, by the provision of leakage paths draining off the high-pressure fluid whenever the piston stroke exceeds its normal limit. Drawbacks of that solution include wasteful fluid circulation and the instability of the piston position which may give rise to objectionable noises and vibrations.

Objects of the Invention

An important object of our present invention, therefore, is to provide means in such a clamping mechanism for effectively absorbing the piston pressure in the event of overtravel without excessively stressing the associated cylinder housing.

A related object is to provide means for automatically preventing the exertion of clamping pressure as long as no force-transmitting train is established between the piston or pistons and the movable platen.

A further object is to provide a compact assembly of a mold drive and a clamping mechanism.

Summary of the Invention

In accordance with a feature of our present invention, the clamping mechanism includes a plurality of cascaded pistons received with progressively increasing clearances in respective cylinder chambers of the associated housing, the pistons moving within the limits of the smallest of these clearances. Under conditions of overtravel, the high-pressure fluid similtaneously admitted to the several cylinder chambers drives the pistons apart so that the piston with the smallest clearance comes to rest first against a transverse end wall of its chamber, followed by successive contact between the other piston or pistons and their end walls. In this way, most of the idle clamping force is absorbed by the housing through the aforementioned end walls. Advantageously, the pistons are jointed together by elastic fastening means such as steel bolts or rivets which stretch upon a forced separation of the pistons as described above; the elastic extensibility of these connectors could be supplemented by strong coil springs interposed between their heads and the housing.

In order to minimize the risk of overtravel, another feature of our invention resides in the provision of sensing means monitoring the position of a force-transmitting element interposable between the piston nearest to the movable palten and a thrust member rigid with the platen. Such a thrust member advantageously is in the shape of a tube surrounding the stem of a plunger which extends along the housing axis and forms part of the mold drive, the plunger being received in a central cylinder within the annular piston assembly of the clamping mechanism. The central cylinder may be axially shiftable, together with its plunger, in the mold-closed position for "mold-breaking" purposes, i.e., for the initial separation of the two platens carrying respective mold halves; the retraction of the plunger, with or without such a mold-breaking operation, may be inhibited by the aforementioned sensing means as long as the force-transmitting element or elements have not been withdrawn from their working position.

The combination of a central drive cylinder with a surrounding annular clamping mechanism may also be used with a single clamping piston. Advantageously, that clamping piston (or the one closest to the movable platen) bears upon a mounting frame traversed by the plunger stem and the surrounding tubular thrust member, the force-transmitting means being constituted by a pair of abutment elements (referred to hereinafter as shutters) guided along that frame for movement toward and away from a median plane. The sensing means may then comprise two pairs of sensors (e.g. of the capacitve type) mounted on the frame, one pair detecting the presence of the shutters in their withdrawn position and the other pair detecting their presence in the working position. With the aid of suitable circuitry, the first pair enables the operation of a mold-break control whereas the second pair enables the operation of a clamping control.

BRIEF DESCRIPTION OF THE DRAWING

The above and other features of our invention will now be described in detail with reference to the accompanying drawing in which:

FIG. 1 is an isometric view (parts broken away) of a clamping mechanism and associated components for the displacement of a movable platen in an injection-molding machine embodying our invention;

SPECIFIC DESCRIPTION

Figure 2:
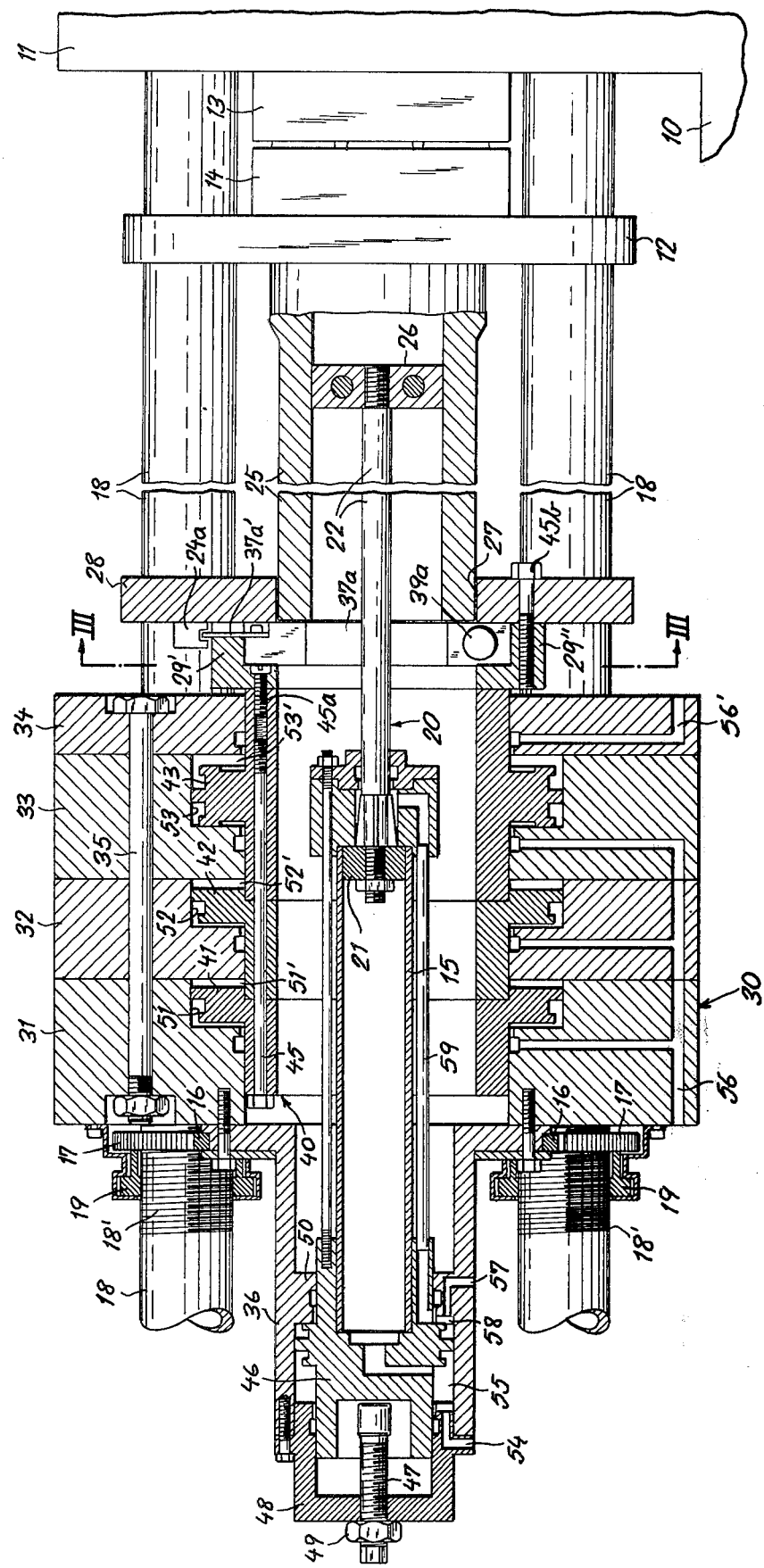
FIG. 2 is an axial elevational view, partly in section, of the components shown in FIG. 1.

The injection-molding machine shown in the drawing comprises a bed 10 rigid with a fixed platen 11 from which a set of tie bars 18 extend to another, nonillustrated portion of the machine frame. A movable platen 12 is slidably supported, in the usual manner, on the tie bars 18 which pass through a housing 30 axially divided into sections 31–34 that are held together by throughgoing bolts 35 (only one shown). Mold halves 13 and 14 are removably carried on platens 11 and 12 in the customary manner. The tie bars 18 have threaded portions 18' matingly engaged by nuts 19 which are rotatably journaled on the housing 30 and are rigid with pinions 17 meshing with a central gear 16, the later being journaled on a tubular housing extension 36 for manual rotation whereby the axial position of housing 30 relative to the fixed platen 11 can be manually adjusted in accordance with different mold sizes; for a given mold, such as the one shown at 13 and 14, the housing 30 may be considered stationary.

Platen 12 is axially reciprocable by a hydraulic drive mechanism including a central cylinder 15 accommodating the head 21 of a plunger 20 provided with an axially extending stem 22. A tubular thrust member 25 coaxially surrounds the stem 22 and is secured thereto through an end disk 26. Member 25 is rigid with platen 12 and is aligned with an aperture 27 of a mounting frame 28 which forms upper and lower guide tracks 29', 29" for a pair of laterally movable shutters 37a, 37b whose movements are controlled by respective hydraulic jacks 38a, 38b. Bumpers 39a, 39b on these shutters limit their approach toward each other on opposite sides of a median plane P (FIG. 3) passing through the central axis A.

Figure 1:
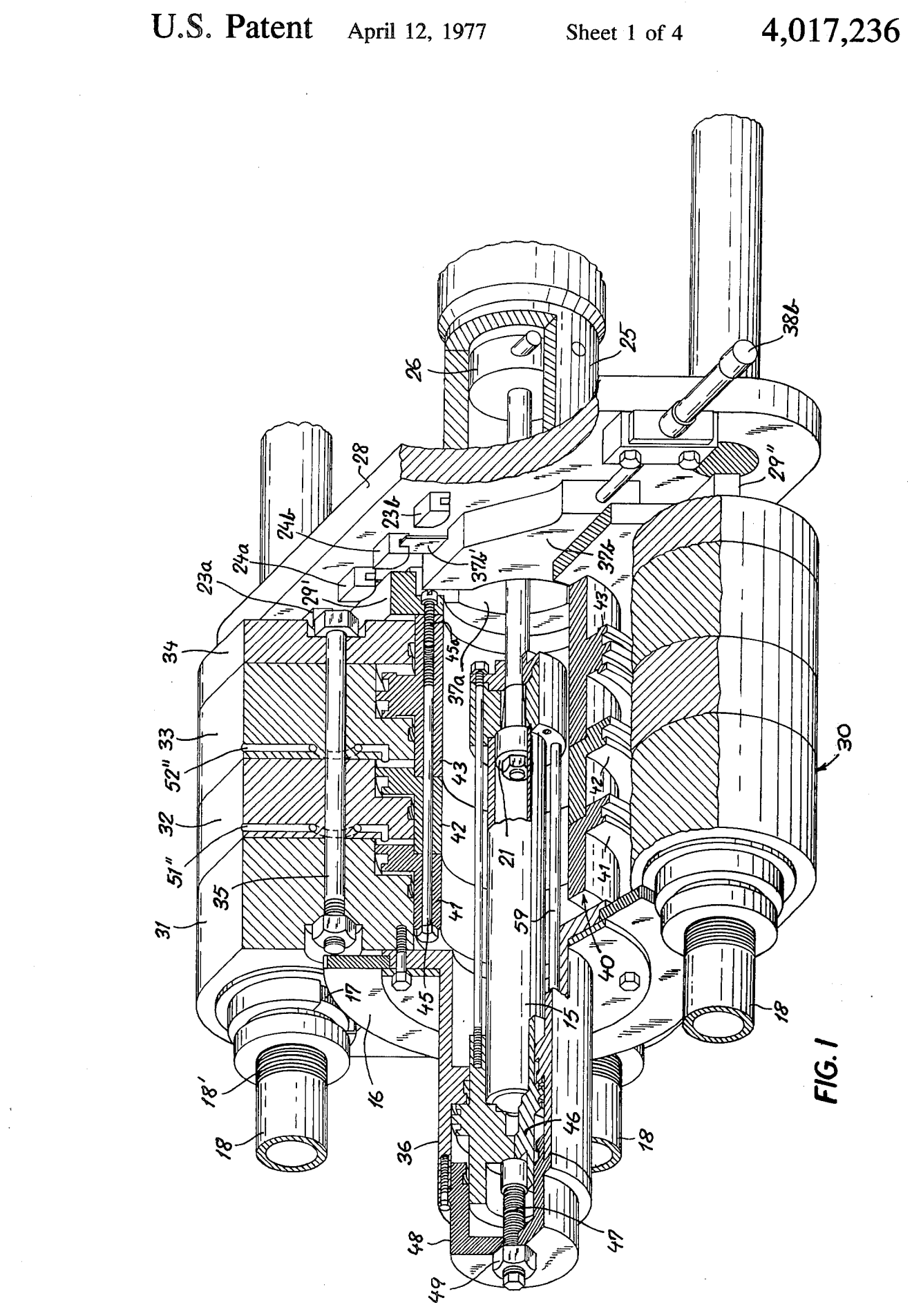
Figure 3:
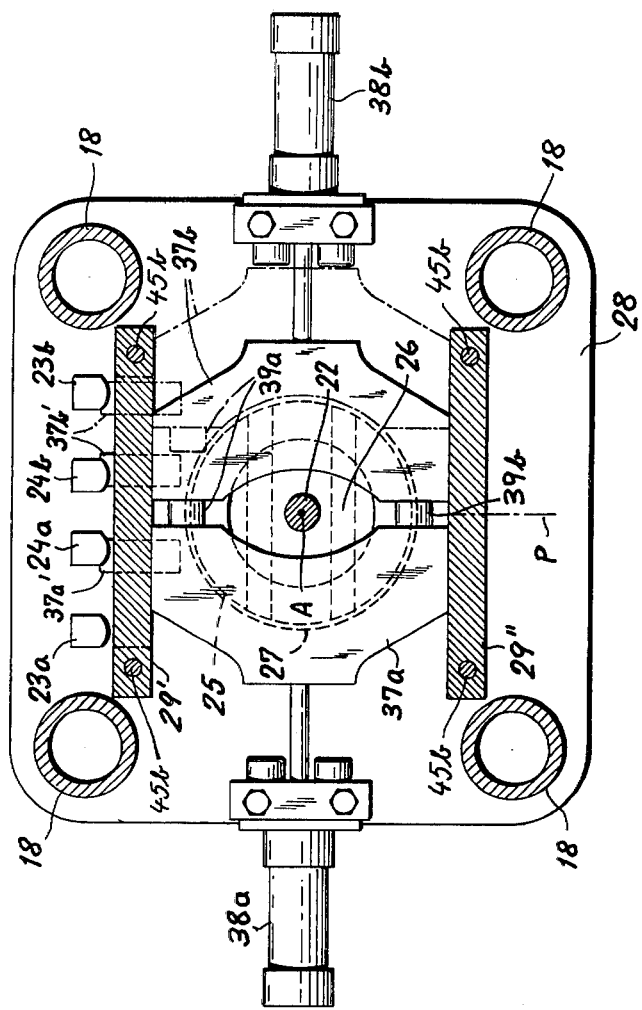
FIG. 3 is a cross-sectional view taken on the line III—III of FIG. 2.

In a working position illustrated in FIG. 1 and also shown in full lines in FIG. 3, the shutters 37a and 37b lie directly behind the left-hand end of tube 25 as viewed in FIG. 2, this being the end remote from platen 12. In that working position, into which the shutters can be moved only upon closure of the mold 13, 14, conductive tabs 37a', 37b', of these shutters coact with a pair of solid-state electronic sensors 24a, 24b mounted on frame 28. In a withdrawn position indicated in phantom lines for the shutter 37b in FIG. 3, these tabs coact with respective snesors 23a, 23b also mounted on frame 28; in that position the shutters are sufficiently separated to let the tube 25 pass through the frame aperture 27 on a mold-opening stroke, i.e. with a leftward motion as viewed in FIG. 2.

A clamping mechanism 40 comprises a set of cascaded annular pistons 41, 42, 43 received in inner peripheral grooves 51, 52, 53 of housing portions 31, 32, 33 defining associated cylinder chambers. The pistons 41–43 are interconnected by a plurality of steel bolts 45 (only one shown). The mounting frame 28 is firmly secured by screws 45a, 45b, through the intermediary of its tracks 29' and 29", to the right-hand piston 43 closest to movable platen 12; in principle, however, bolts 45 could be extended into that frame to replace the screws 45a. The bolts 45 normally unite the pistons 41–43, together with the frame 28, into a solid body yet, by virture of their inherent elasticity, permit a certain axial separation of the pistons under conditions described hereinafter with reference to FIG. 4B. In the unoperated position of the clamping mechanism illustrated in FIG. 2, piston 43 bears upon the left-hand boundary of its chamber 53 while being separated by a relatively large clearance 53' from the right-hand end wall thereof which is constituted by a face of housing section 34. Progressively smaller clearances 52' and 51' then separate the pistons 42 and 41 from corresponding end walls represented by the left-hand faces of housing sections 33 and 32, respectively; these latter clearances are vented at 52" and 51" (FIG. 1) to the atmosphere.

Central cylinder 15 is limitedly axially movable within the housing and terminates at its left-hand end, remote from platen 12, in a head 46 which can slide in housing extension 36 to an extent permitted by a stop screw 47 threaded into an end cap 48 of that extension. A lock nut 49 secures the screw 47 in its selected position which, in a limiting case, may immobilize the cylinder head 46 against an internal partition 50 of housing extension 36.

A port 54 in end cap 48 serves for the admission of hydraulic fluid (referred to hereinafter as oil) into a space 55 within housing extension 36 and also into the interior of cylinder 15. The pressure of this fluid forces the head 46 against the partition 50, if it had been previously separated therefrom, and drives the plunger 20 to the right along with tube 25 and platen 12 carrying mold half 14. As the mold closes, the plunger reaches the limit of its forward stroke just when the tube 25 clears the shutters 37a, 37b in frame 28. Pressurization of jacks 38a, 38b then moves these shutters into the working position shown in FIGS. 2 and 3 whereupon oil is admitted via an inlet 56 into chambers 51–53 to drive the pistons 41–43 to the right together with frame 28 and shutters 37a, 37b. This movement exerts a clamping force upon mold half 14 through the intermediary of tube 25 and platen 12. After the injection of thermoplastic material into the mold cavity or cavities, oil is fed through a port 56' into clearance 53' to return the pistons 41–43 to their original position; then the shutters 37a and 37b are laterally withdrawn whereupon oil is introduced through a port 57 into a space 58 for shifting the cylinder head 46 to the left, to the extent permitted by screw 47, with incipient separation of mold halves 13 and 14 from each other. This mold-breaking action is followed by a reverse stroke of plunger 20 as the oil passes through a conduit 59 from chamber 58 into the right-hand end of cylinder 15, building up pressure therein as soon as the head 46 has come to rest. Upon ejection of the molded article or articles, the cycle is repeated. If no separate mold-breaking operation is desired, stop screw 47 is set in its limiting position blocking the axial displacement of cylinder head 46.

Figure 4A:
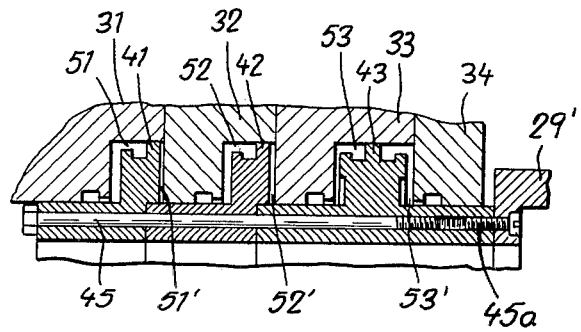
FIGS. 4A and 4B are two fragmentary axial sections of a piston assembly, forming part of the clamping mechansim of FIGS. 1 and 2, in a normal operating position and in an overtravel position, respectively.
Figure 4B:
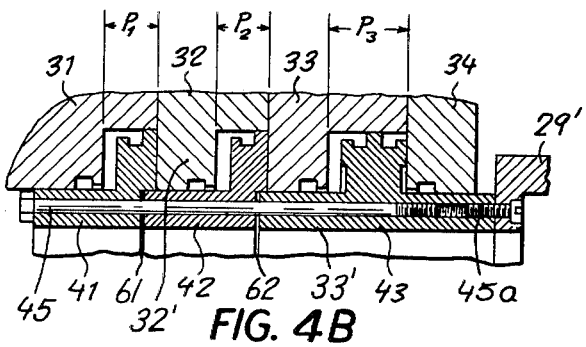

FIG. 4A illustrates the positions of pistons 41–43 during a normal clamping operation. It will be noted that none of the clearances 51'–53' has disappeared completely.

Let us assume, now, that the absence of a mold 13, 14, a faulty adjustment of pinions 17 or a failure of jacks 38a, 38b to shift the shutters 37a, 37b into their working position eliminates the reaction force which normally limits the stroke of these pistons to less than the width of the smallest clearance 51' associated with the piston 41 farthest from platen 12. Under these no-load conditions, the pistons will overtravel to the right under the pressure of the oil delivered to inlet 56 and piston 45 will contact the confronting face of housing section 32, with elimination of clearance 51' and the buildup of a pressure $P_1$ in chamber 51. A corresponding pressure $P_2$ in chamber 52 drives the piston 42 still further to the right into contact with a face of section 33, with elimination of clearance 52' and a stretching of bolts 45 as a gap 61 develops between pistons 41 and 42, the width of this gap equaling the difference between the original widths of clearances 51' and 52'. In an analogous manner, a pressure $P_3$ builds up in chamber 53 and forces the piston 43 into contact with a face of section 34, causing the disappearance of clearance 53' and the formation of a gap 62 between pistons 42 and 43 having a width equal to the difference between the original widths of clearances 52' and 53'. This stretching of bolts 45, of course, must not exceed the elastic limit of their material.

Pressures $P_1$ and $P_2$, acting from opposite sides upon equal areas of a rib 32' of housing section 32, balance each other; the same is true of pressures $P_2$ and $P_3$ acting upon a rib 33' of section 33. The resultant pressure differential, tending to drive apart the outer housing sections 31 and 334 against the restraining force of their mounting bolts 35 (FIG. 2), therefore has the magnitude of only one of these components $P_1$–$P_3$, i.e. one-third of the overall clamping force normally applied to the mold. With a larger number of pistons and housing sections, of course, the fraction of this force to be absorbed by the housing is further reduced.

Figure 5:
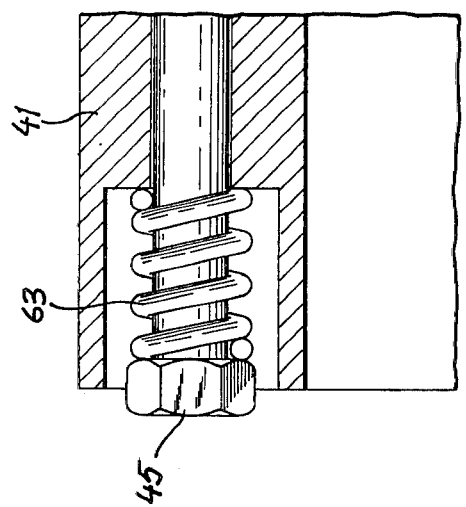
FIG. 5 is a fragmentary detail view illustrating a modification.

If the inherent elasticity of fastening bolts 45 is insufficient to permit the necessary axial separation of the pistons in the event of overtravel, springs 63 may be added as illustrated in FIG. 5. Any throughgoing bolt 45 could also be replaced by shorter ones interconnecting only adjacent piston pairs 41–42 and 42–43. Since these elastic fasteners in any event absorb only a minor fraction of the fluid pressure in the event of overtravel, their main purpose is to simplify the assembly and they could therefore be omitted in many instances.

Figure 6:
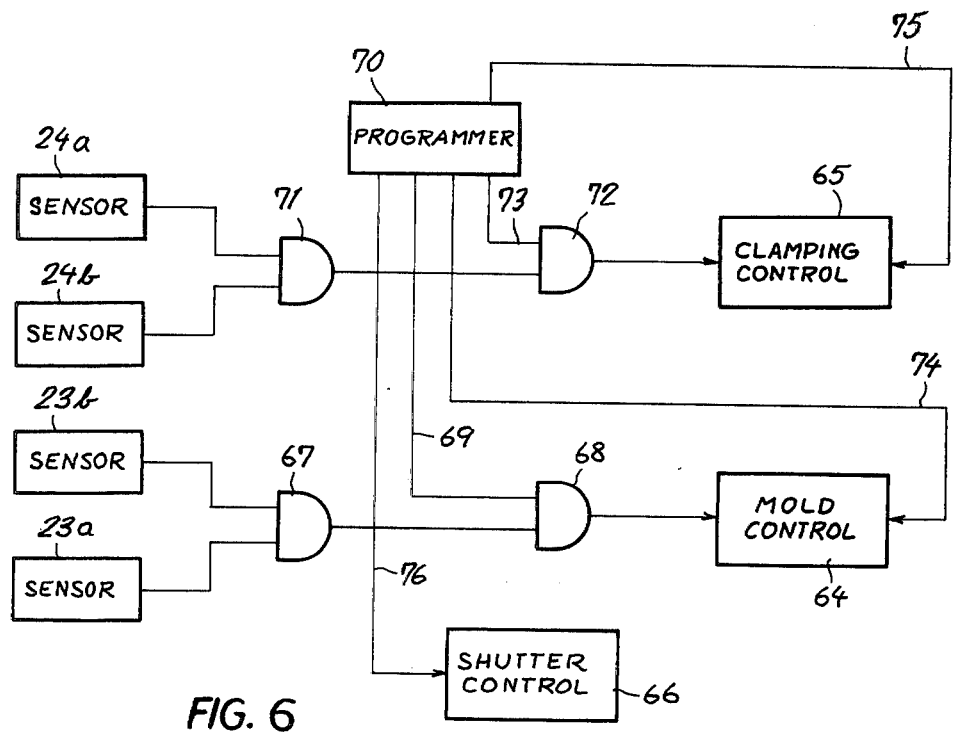
FIG. 6 is a diagram of a control circuit for the admission of hydraulic fliud to the components shown in FIGS. 1–3.

In FIG. 6 we have shown a control circuit for a set of electromagnetic valves designed to distribute oil under pressure from a nonillustrated supply to the various ports as described above. These valves, not separately illustrated, are part of a mold-control unit 64, a clamping-control unit 65 and a shutter-control unit 66, all normally energized in predetermined cyclic succession by a programmer 70. Sensors 23a and 23b work into an AND gate 67 which conducts in the withdrawn position of shutters 37a and 37b, thereby unblocking an AND gate 68 inserted in an output lead 69 of programmer 70 serving to transmit to unit 64 a command for the admission of oil to port 57; thus, the retraction of plunger 20 and platen 12 from the mold-closed position cannot be initiated as long as either or both shutters are still aligned with tube 25. Similarly, sensors 24a and 24b work into an AND gate 71 whose conduction in the working position of the shutters unblocks an AND gate 72 for the transmission from programmer 70 to unit 65, via an output lead 73, of a command for the admission of oil to inlet 56, whereby clamping pressure is exerted upon the mold 13, 14. Voltage on leads 74 and 75, which are not controlled by the sensors, commands the admission of oil to port 54 for advancing the plunger 20 from the mold-closed position and to inlet 56' for the restoration of clamping assembly 40 to normal. The displacement of shutters 37a, 37b into and out of their working position is controlled by unit 66 in response to the presence or absence of a command signal on a programmer lead 76.

Although the use of two symmetrically displaceable shutters 37a, 37b is preferred, our improved clamping mechanism can also operate with a single shutter forming an abutment for tube 25 when shifted across frame opening 27.

We claim:

1. In an injection-molding machine provided with a fixed platen, a movable platen and fluid-operated drive means for reciprocating said movable platen along an axis with reference to said fixed platen between a mold-open and a mold-closed position, the combination therewith of:
   a stationary housing forming a plurality of cylinder chambers bounded by end walls generally transverse to said axis;
   a like plurality of pistons respectively received in said chambers;
   a thrust member rigid with said movable platen advancing past said pistons in a mold-closing stroke;
   force-transmitting means mounted on said housing for engagement with said member in said mold-closed position;
   actuating means carried on said housing for moving said force-transmitting means into and out of engagement with said member; and
   clamping means connected with said housing for admitting high-pressure fluid simultaneously to said chambers upon engagement of said force-transmitting means with said member in said mold-closed position, said pistons being operationally linked with said force-transmitting means and being normally separated from said end walls by clearances increasing progressively in the direction of mold-closing motion, the smallest of said clearances being sufficient to allow an axial displacement of said member with exertion of pressure upon a mold between said platens whereby said pistons successively come to rest against said end walls with separation from one another under the pressure of said fluid in the event of accidental overtravel.

2. The combination defined in claim 1 wherein said pistons are annular, said drive means comprising a central cylinder extending axially within said body and a fluid-operated plunger in said central cylinder having a stem linked with said movable platen, said member being tubular and surrounding said stem.

3. The combination defined in claim 2 wherein said force-transmitting means comprises a mounting frame rigid with the piston closest to said movable platen and abutment means displaceable on said frame into a working position in line with said member at an end thereof remote from said movable platen.

4. The combination defined in claim 3 wherein said abutment means comprises a pair of shutter elements oppositely displaceable by said actuating means between said working position adjacent a median plane and a withdrawn position remote from said plane, said elements being concave toward said plane.

5. The combination defined in claim 4 wherein said mounting frame is provided with sensing means for monitoring the position of said elements, and circuitry controlled by said sensing means for inhibiting the operation of said clamping means in the withdrawn position and the reopening of the mold in the working position of said elements.

6. The combination defined in claim 5 wherein said central cylinder is axially shiftable, further comprising mold-breaking means for exerting fluid pressure upon said plunger through said central cylinder in said mold-closed position to separate said movable platen from said fixed platen, said circuitry inhibiting the operation of said mold-breaking means in the working position of said elements.

7. The combination defined in claim 6 wherein said housing is provided with a conduit for admitting high-pressure fluid to the piston closest to said movable platen in a direction adapted to release the pressure exerted upon said mold prior to operation of said mold-breaking means.

8. The combination defined in claim 1, further comprising elastic fastening means interconnecting said pistons into a unitary body.

9. In an injection-molding machine provided with a fixed platen, a movable platen and fluid-operated drive means for reciprocating said movable platen along an axis with reference to said platen between a mold-open and a mold-closed position, the combination therewith of:
a stationary housing on the side of said movable platen remote from said fixed platen;
tie rods linking said housing with said fixed platen, said movable platen being slidable on said tie rods;
a mounting frame slidably disposed on said tie rods between said housing and said movable platen;
a thrust member rigid with said movable platen traversing said frame in said mold-open position and clearing said frame in said mold-closed position;
abutment means displaceable on said frame in said mold-closed position between a working position in line with said member and a laterally withdrawn position;
a plurality of cascaded annular pistons in said housing engageable with said member through said abutment means for exerting a clamping pressure upon a mold between said platens upon displacement of said abutment means into said working position, said drive means including a rod traversing said pistons and said frame; and
control means connected with said housing for admitting high-pressure fluid to said pistons in said housing to exert said clamping pressure, said housing forming a plurality of cylinder chambers receiving said pistons with clearances increasing progressively in the direction of mold-closing motion, the smallest of said clearances being sufficient to allow an axial displacement of said member to generate said changing pressure, said clearances being bounded by housing walls against which said pistons successively come to rest with separation from one another under the pressure of said fluid in the event of accidental overtravel.

10. The combination defined in claim 9, further comprising sensing means on said mounting frame for monitoring the position of said abutment means, said sensing means inhibiting the admission of high-pressure fluid to said piston means by said control means in the withdrawn position of said abutment means.

11. The combination defined in claim 9, further comprising fastening means interconnecting said pistons into a unitary body, said fastening means being capable of sufficient elastic elongation to let said pistons successively come to rest against end walls of their respective cylinder chambers under the pressure of said fluid in the event of accidental overtravel.

* * * * *